UNITED STATES PATENT OFFICE.

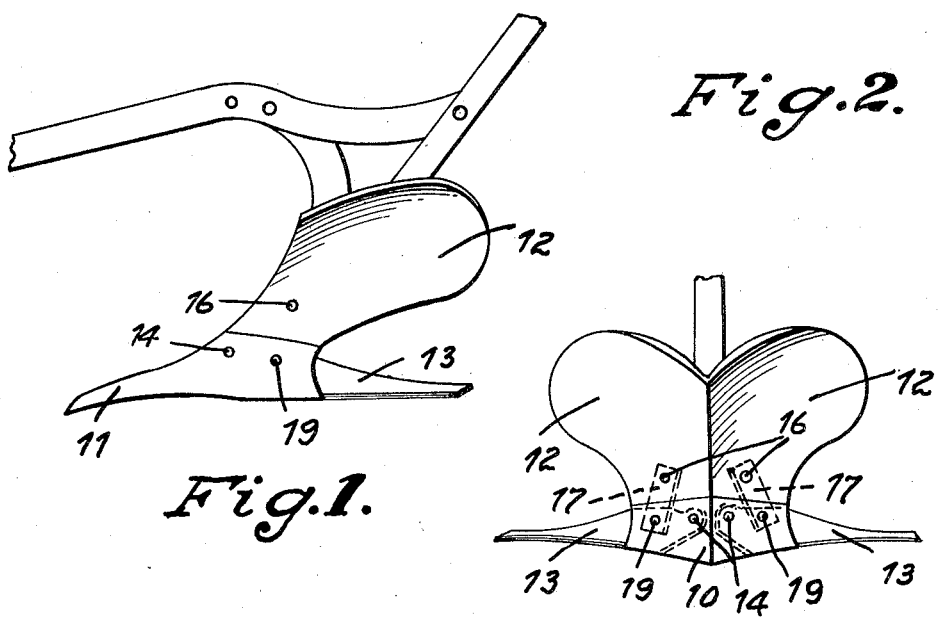
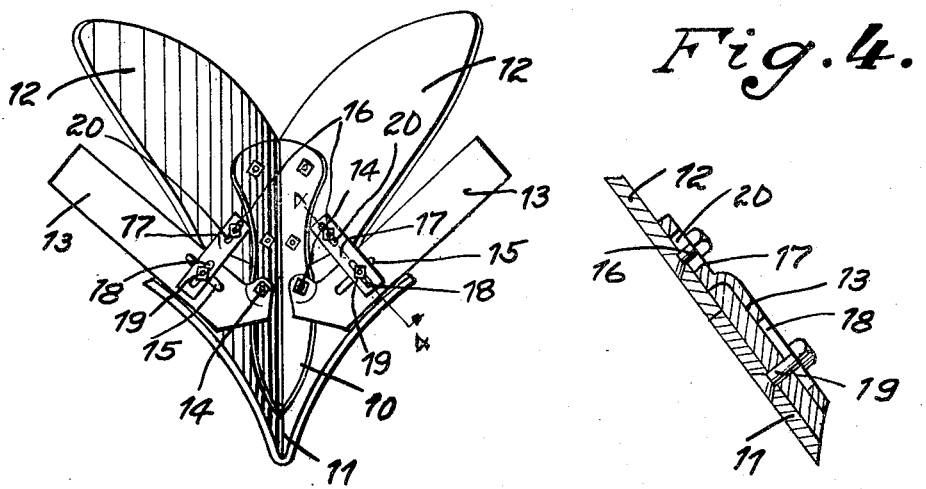

WILLIAM J. UNDERWOOD, OF SHAFTER LAKE, TEXAS.

WEED-CUTTER FOR PLOWS.

1,102,703. Specification of Letters Patent. Patented July 7, 1914.

Application filed January 21, 1914. Serial No. 813,527.

*To all whom it may concern:*

Be it known that I, WILLIAM J. UNDERWOOD, a citizen of the United States, residing at Shafter Lake, in the county of Andrews, State of Texas, have invented certain new and useful Improvements in Weed-Cutters for Plows; and I do hereby declare the following to be a full, clear, and exact description of the invention, such as will enable others skilled in the art to which it appertains to make and use the same.

This invention relates to improvements in plows and particularly to the type known as middle breaker plows.

The principal object of the invention is to provide a simple device for attachment to the type of middle breaker plows, for cutting weeds and other vegetation when preparing the soil for planting.

Another object is to provide devices of this character which are readily adjustable to any size plow of this type.

Other objects and advantages will be apparent from the following description, when taken in connection with the accompanying drawings.

In the drawings: Figure 1 is a side elevation of the middle breaker plow showing my invention attached thereto. Fig. 2 is a front elevation. Fig. 3 is a bottom plan view. Fig. 4 is a transverse section on the line 4—4 of Fig. 3.

Referring particularly to the accompanying drawings, 10 represents the frog of the middle breaker plow to which the point 11 and the moldboards 12 are attached. Secured to the bottom of the frog 10, and extending in opposite directions from the sides thereof are the horizontally disposed flat wings 13. Each of these wings is secured at its inner end by means of a bolt 14, and is provided with an elongated slot 15 adjacent the end. Secured to the moldboard by means of the bolt 16 is a bracing link 17, this link having a slot 18 in its lower end which crosses the slot 15 of the wing, a bolt 19 being engaged through these slots so that the wing can be adjusted to various positions, and a slot 20. These wings have their advanced edges sharpened, and are arranged to move in an approximately horizontal plane beneath the soil, to cut the roots of weeds or other undesirable vegetation to a suitable distance on each side of the plow. By means of the bolts and slots of the links and wings, the wings can be swung into various angles with respect to the line of draft forwardly or backwardly so as to regulate both the width of the sweep, and the depth of the cut.

What is claimed is:—

The combination with a double moldboard plow, of wings pivotally secured to the bottom face of the frog of the plow and extending laterally from opposite sides thereof, each of the wings having a longitudinal slot adjacent the pivot end, a link pivotally connected to each of the moldboards, the lower end of said link having a longitudinal slot the slotted ends of the link being disposed transversely of the slotted portion of the wing, and a clamping bolt passed through the said slots.

In testimony whereof, I affix my signature, in the presence of two witnesses.

WILLIAM J. UNDERWOOD

Witnesses:
RALPH M. KING,
ANDREW KING.